United States Patent [19]

Coplin

[11] Patent Number: 4,827,712
[45] Date of Patent: May 9, 1989

[54] TURBOFAN GAS TURBINE ENGINE

[75] Inventor: John F. Coplin, Derby, England

[73] Assignee: Rolls-Royce plc, London, England

[21] Appl. No.: 123,544

[22] Filed: Nov. 20, 1987

[30] Foreign Application Priority Data

Dec. 23, 1986 [GB] United Kingdom ............. 8630754

[51] Int. Cl.⁴ .............................................. F02K 3/04
[52] U.S. Cl. .............................. 60/226.1; 60/39.161;
60/751; 415/210.1
[58] Field of Search ................. 60/226.1, 39.161, 751,
60/262, 268, 39.162, 726; 415/210, 207;
416/171, 170 R; 181/229

[56] References Cited

U.S. PATENT DOCUMENTS

| | | | |
|---|---|---|---|
| 2,627,721 | 2/1953 | Rosenlund | 60/751 |
| 3,792,586 | 2/1974 | Kasmarik et al. | |
| 3,830,058 | 8/1974 | Ainsworth | 60/226.1 |

FOREIGN PATENT DOCUMENTS

| | | |
|---|---|---|
| 228365 | 2/1925 | United Kingdom . |
| 692188 | 6/1953 | United Kingdom . |
| 911160 | 11/1962 | United Kingdom . |
| 1345892 | 2/1974 | United Kingdom . |
| 1463722 | 2/1977 | United Kingdom . |
| 1575360 | 9/1980 | United Kingdom . |
| 2155110A | 9/1985 | United Kingdom . |

OTHER PUBLICATIONS

Lefebvre, *Gas Turbine Combustion*, Hemisphere Pub. Corp., McGraw-Hill, pp. 86–87, 1983.
Shen, "Power Flow in a Differential", *Machine Design*, Apr. 8, 1976, pp. 77–79.

*Primary Examiner*—Donald E. Stout
*Attorney, Agent, or Firm*—Cushman, Darby & Cushman

[57] ABSTRACT

A turbofan gas turbine engine comprising in axial flow series a fan, a booster compressor and a core engine is provided with a diffuser. The diffuser is positioned axially between the booster compressor and the compressor of the core engine to efficiently diffuse the air from the fan to the compressor of the core engine. The diffuser comprises a plurality of circumferentially arranged geodesic pipe diffusers, the pipe diffusers extend axially and radially and the outlets of the pipe diffusers are displaced circumferentially by an angle of between 20° and 60° with respect to the inlets of the pipe diffusers.

The geodesic pipe diffusers allows the airflow between the fan and the core engine to be diffused adequately without compromising the efficiency of the core engine, or the high mass flow rate of the fan and also minimizes the length, weight and drag of the gas turbine engine.

19 Claims, 4 Drawing Sheets

TURBOFAN GAS TURBINE ENGINE

The present invention relates to turbofan gas turbine engines, and is particularly concerned with turbofan gas turbine engines in which the fan is geared.

Turbofan gas turbine engines comprise a fan, and a core engine.

In a turbofan gas turbine engine high propulsive efficiency is achieved by having a large mass flow rate through the fan. The benefit in propulsive efficiency produced by the large air mass flow rate is partially offset by the drag of the fan casing which surrounds the fan. To minimise the drag of the fan casing, the diameter and length of the fan casing can be minimised. An important factor in achieving a high propulsive efficiency with a minimum of drag is the use of a fan with the highest possible throughput velocity.

The fan is driven by the core engine, the efficiency of which is favoured by a relatively low axial velocity. The conflict between the demand for relatively high axial velocity air for the fan, and the demand for relatively low axial velocity air for the core engine, requires that the airflow from the root portion of the fan is efficiently diffused as it flows to the core engine.

An optimum diffuser requires a minimum of deflection or curvature in order to avoid airflow separation on the highest aerodynamically loaded wall and its attendent problems for the core engine. An axially straight optimally designed diffuser is ideal.

To minimise the weight of the engine the length between the fan and the core engine must be minimised, also low drag is favoured by reducing the length between the fan and the core engine.

A high bypass ratio fan has a relatively large fan exit diameter while the core engine has a relatively small inlet diameter.

The fan requires a low tip speed for peak efficiency, and if the fan is positioned upstream of the core engine, the fan cannot be directly driven by its low pressure turbine without excessive compromise in the hub/tip diameter ratio of the core engine with associated core engine efficiency loss. A reduction gear is included to enable the high power demand of the fan to be supplied through a relatively small diameter and relatively high speed low pressure turbine shaft.

A booster compressor raises the pressure of the air supplied from the fan to the core engine, and the booster compressor requires a number of stages of blades to produce a suitable pressure rise in the air for the core engine.

The booster compressor has to match the operating requirements of the fan and the core engine, and the booster compressor has to operate over a wide range of mass flow rates of air at a pressure ratio, and this is commonly achieved using variable stator vanes.

Again to minimise the weight and drag of the engine the length of the booster compressor must be minimised.

The present invention seeks to provide a geared turbofan gas turbine which has high propulsive efficiency, substantially less weight and substantially less drag.

Accordingly the present invention provides a turbofan gas turbine engine comprising in axial flow series a fan, booster compressor means, compressor means, combustor means, first turbine means and second turbine means, the first turbine means being adapted to drive the compressor means via first shaft means, the second turbine means being adapted to drive the booster compressor means via second shaft means and the second turbine means being adapted to drive the fan via the second shaft means and gear means.

The present invention also provides a turbofan gas turbine engine comprising in axial flow series a fan, booster compressor means, compressor means, combustor means, first turbine means, and second turbine means, the first turbine means being adapted to drive the compressor means, the second turbine means being adapted to drive the fan and the booster compressor means, the booster compressor means comprising a plurality of wide chord blades arranged circumferentially on a rotor in one or more stages. Preferably a single stage.

The present invention also provides a turbofan gas turbine engine comprising in axial flow series a fan, booster compressor means, compressor means, combustor means, first turbine means, and second turbine means, the first turbine means being arranged to drive the compressor means, the second turbine means being arranged to drive the fan and the booster compressor means, diffuser means being positioned axially between the booster compressor means and the compressor means, the diffuser means comprising a plurality of circumferentially arranged geodesic pipe diffusers, the outlets of the geodesic pipe diffusers being displaced circumferentially by an angle with respect to the inlets of the pipe diffusers.

The present invention will be more fully described by way of example with reference to the accompanying drawings in which.

Figure 1:
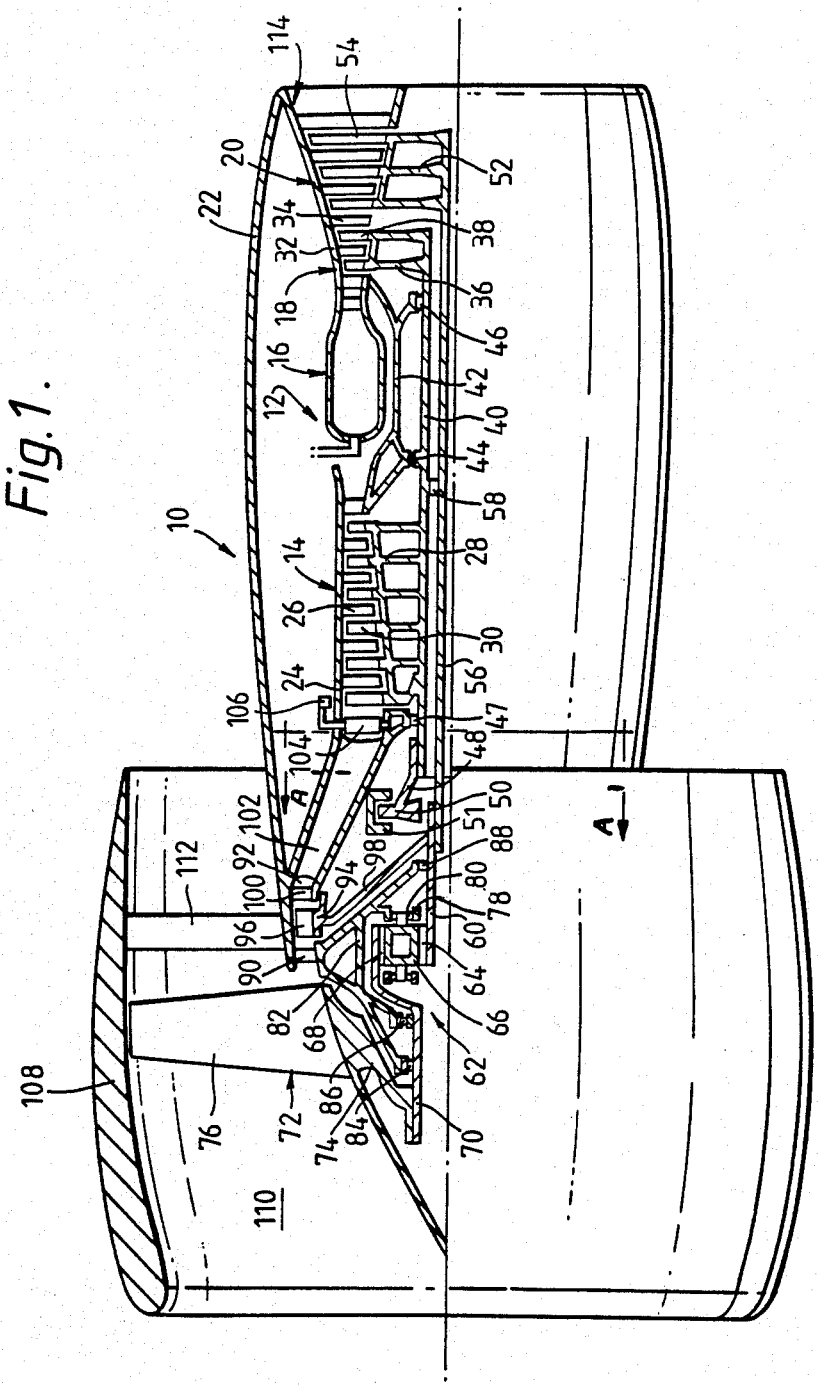
FIG. 1 is a part sectional view of a turbofan gas turbine engine according to the present invention.
Figure 2:
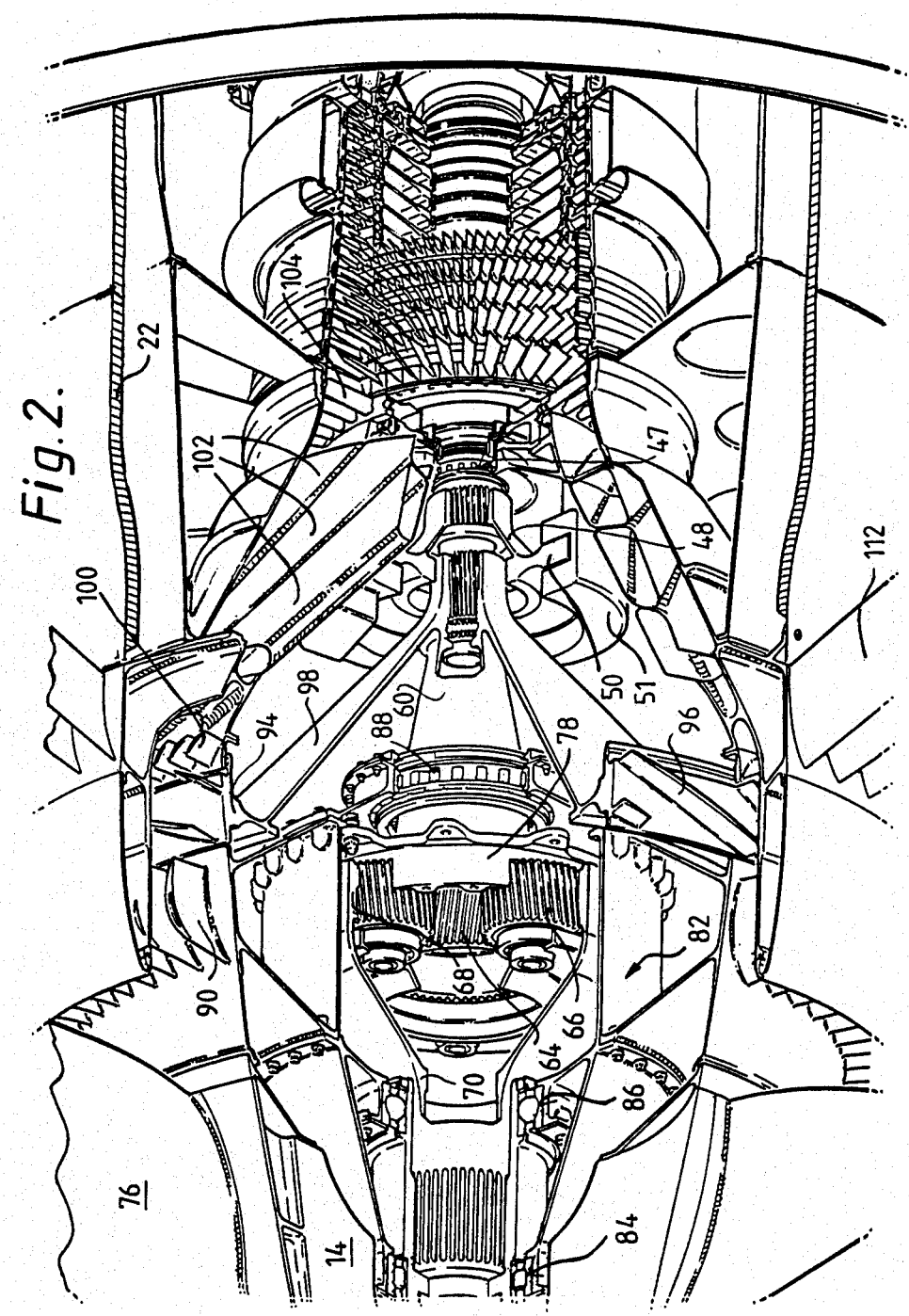
FIG. 2 is an enlarged cut-away perspective view of part of the turbofan gas turbine engine in FIG. 1 showing the present invention.

A turbofan gas turbine engine 10 is shown in FIGS. 1 and 2 and comprises a core engine 12 and a fan assembly 72. The core engine 12 comprises in axial flow series compressor means 14, combustor means 16, first turbine means 18 and second turbine means 20. The core engine 12 is surrounded by a coaxial core casing 22. The compressor means 14 comprises a stator casing 24 which carries a plurality of axially spaced stages of radially inwardly extending stator vanes 26, and a rotor 28 which carries a plurality of axially spaced stages of radially outwardly extending rotor blades 30. The rotor blades and stator vanes being arranged axially alternately. The first turbine means 18 comprises an upstream portion of a stator casing 32 which carries a plurality of axially spaced stages of radially inwardly extending stator vanes 34, and a rotor 36 which carries one stage of radially outwardly extending rotor blades 38, or a plurality of axially spaced stages of radially outwardly extending rotor blades 38. The rotor 36 of the first turbine means 18 is arranged to drive the rotor 28 of the compressor means 14 via a first shaft 40. The shaft 40 is rotatably mounted on a static structure 42 by a ball bearing 44 and a roller bearing 46, which are axially spaced. The static structure 42 is secured to the stator casing 24 of the compressor means 14 and the stator casing 32 of the turbine means 18. The upstream end of the shaft 40 is rotatably mounted by a roller bearing 47.

A stub shaft 48 is secured to the upstream end of the shaft 40, for example by a splined coupling, and a rotor 50 is secured to the stub shaft 48. The rotor 50 has an array of samarium cobalt permanent magnets secured thereto, and the rotor 50 is arranged to rotate coaxially within a stator 51, which has wiring wound around. The rotor 50 and stator 51 thus form a samarium cobalt starter/generator which in one mode of operation is used to provide electrical power for an associated aircraft when driven by shaft 40, or in a second mode of operation is used to drive the shaft 40 in order to start the gas turbine engine, as is well known in the art.

The second, low pressure, turbine means 20 comprises a downstream portion of the stator casing 32 which carries a plurality of axially spaced stages of radially inwardly extending stator vanes 34, and a rotor 52 which carries a plurality of axially spaced stages of radially outwardly extending rotor blades 54. The second turbine means 20 is arranged to drive the fan assembly 72 via a second shaft 56, which extends coaxially through the first shaft 40 and is rotatably mounted with respect to the first shaft 40 by a bearing 58.

The core engine and its operation are quite conventional and it will not be discussed further herein.

A stub shaft 60 is secured to the upstream end of the shaft 56, for example by a splined coupling or other suitable means, and the stub shaft 60 drives a gear assembly 62. The gear assembly 62 comprises a sun gear 64 which is secured to, and driven by the stub shaft 60, a plurality of planet gears 66 meshing with and driven by the sun gear 64 and an annulus gear 68 meshing with and driven by the planet gears 66. The annulus gear 68 is secured to, or is integral with, a shaft 70, which extends in an upstream direction from the gear assembly 62. The shaft 70 is secured to and drives the fan assembly 72. The annulus gear may be secured to the shaft 70 so as to allow the gear assembly to float for equal power sharing. The planet gears 68 are rotatably mounted in a planet carrier 78 by bearings 80.

The fan assembly 72 comprises a fan rotor 74 which carries a plurality of radially outwardly extending fan blades 76. The fan assembly is positioned upstream of the core engine 12 and is arranged to rotate coaxially therewith. The fan rotor 74 is secured to the shaft 70 by means of a splined coupling, a curvic coupling or other suitable means. The fan blades 76 may be of any suitable form, but are preferably laminar flow supercritical aerofoils of wide chord, and are preferably formed from titanium sheets, with a honeycomb filler.

The planet carrier 78 is secured to a gear housing 82 which surrounds the gear assembly 62. The stub shaft 60 is rotatably mounted on the gear housing 82 by a bearing 88, and the shaft 70 is rotatably mounted on the gear housing 82 by axially spaced roller bearing 84 and ball bearing 86. The gear housing 82 is secured to the upstream end of the core engine casing 22 by a plurality of radially extending vanes 90 which form an opening, downstream of the fan assembly, for the supply of air through an inlet duct 92 to the core engine 12.

A booster compressor means is positioned axially between the fan assembly 72 and the core engine 12, within the inlet duct 92, to boost the pressure of the air supplied to the core engine 12. The booster compressor means comprises a booster rotor 94 which carries a plurality of radially outwardly extending blades 96. The booster rotor 94 only carries a single stage of blades 96, and the blades are of wide chord form which turn the airflow tangentially. The booster rotor 94 is connected to, or is integral with, and driven by the stub shaft 60 via a conical shaft 98. The number of blades 96 is chosen so that the frequency of noise produced, by the tips travelling supersonically, is above the audible range.

A plurality of guide vanes 100 are positioned in the inlet duct 92 downstream of the booster compressor, and the guide vanes 100 are arranged to direct the air flow from the booster compressor radially inwards into a diffuser means positioned in the inlet duct 92 between the booster compressor and the compressor means of the core engine. The diffuser means comprises a plurality of circumferentially arranged geodesic, or geodetic, pipe diffusers 102 positioned downstream of the guide vanes 100. The geodesic pipe diffusers extend axially and radially inwardly to the upstream end of the compressor means, and the outlets of the geodesic pipe diffusers are displaced circumferentially by an angle of between 20° and 60° with respect to the inlets of the geodesic pipe diffusers.

Each geodesic pipe diffuser follows substantially the shortest path possible between the inlet and the outlet thereof, and each geodesic pipe diffuser follows a straight line path as seen in FIG. 2. Each geodesic pipe diffuser is defined by a radially inner wall, a radially outer wall and generally radially extending sidewalls.

The inlet of each geodesic pipe diffuser is arranged in a first plane perpendicular to the axis of the engine, and in a like manner the outlet of each geodesic pipe diffuser is arranged in a second plane perpendicular to the axis of the engine, and the second plane is positioned axially downstream of the first plane.

At the inlet of each geodesic pipe diffuser the inner and outer walls 120, 122, extend circumferentially, and the sidewalls 124 extend radially. At the outlet of each geodesic pipe diffuser the inner and outer walls extend circumferentially and the sidewalls extend radially. The inlet of each geodesic pipe diffuser has a central point 126 in the first plane, and the outlet of each geodesic pipe diffuser has a central point 128 in the second plane, and a straight line 130 which is the central line of each geodesic pipe diffuser interconnects the central point in the first plane with the central point in the second plane. The points of intersection of the walls, or corners, of each geodesic pipe diffuser lie in straight lines, the straight lines extend from the four points of intersection of the walls in the first plane at the inlet to the corresponding four points of intersection of the walls in the second plane at the outlet.

For each geodesic pipe diffuser the angle between the sidewalls at the outlet is the same as the angle between the sidewalls at the inlet. But the circumferential dimension of the outlet is less than the circumferential dimension of the inlet, due to the fact that the outlet is at a smaller radial distance from the axis of the engine. The outlet of each geodesic pipe diffuser therefore is provided with a greater radial dimension than the inlet so that the area of the outlet is greater than the area of the inlet. An increase of area of the geodesic pipe diffuser is required in a downstream direction for diffusion to take place.

Adjacent geodesic pipe diffusers may have a common sidewall, or their respective sidewalls may abut each other as shown in FIG. 2. The sidewalls may be formed from twisted plates. The inner and outer walls of each geodesic pipe diffuser lie on the circumference of concentric circles for each cross-section through the geodesic pipe diffuser in any plane perpendicular to the axis of the engine.

It is possible to use geodesic pipe diffusers with other shapes and cross-sectional shapes, for example the geodesic pipe diffusers may have a circular cross-section at the inlet which flares to an elliptical cross-section at the outlet. The main feature is that the central line of each geodesic pipe diffuser follows a straight line path.

The geodesic pipe diffusers are preferably arranged at the natural exit angle of the air from the booster compressor. The guide vanes upstream of the geodesic pipe diffusers give a radial flow component to the air for it to flow down the geodesic pipe diffusers. The inlet duct may have a curvature to give a radial flow component to the air for it to flow down the geodesic pipe diffusers.

The optimum displacement between the outlets and inlets of the geodesic pipe diffusers is dependent on the particular arrangement, i.e. the degree of whirl produced by the booster rotor, and the radial distance between the booster compressor and the compressor of the core engine. In the particular embodiment shown the displacement angle is substantially 40°. A stage of variable guide vanes 104 is positioned at the upstream end of the compressor means of the core engine, and the guide vanes are operated by a control ring 106.

The variable guide vanes 104 are varied between substantially zero angle, with respect to the axis of the compressor, at ground idle, to substantially 40° at high speed.

The fan assembly 72 is surrounded by a coaxial fan casing 108 to form a fan duct 110, and the fan casing 108 is secured to the core casing 22 by a plurality of circumferentially arranged radially extending struts 112. The fan casing is preferably of laminar supercritical form optimised for cruise efficiency, is of lightweight structure and is relatively short and thin to reduce weight and drag of the gas turbine engine.

The downstream end of the core engine 12 is provided with a variable area exhaust nozzle which is achieved for example by pivoted flaps or petals 114 or by an axially moveable plug positioned coaxially in the centre of the exhaust. The variable area exhaust nozzle is used to vary the expansion ratio of the second, low pressure, turbine. At take off condition the petals 114 are opened to give a maximum area for the exhaust nozzle, so that the back pressure is minimised, the pressure ratio is increased and the second turbine rotates faster which in turn drives the fan, and booster compressor, faster to give more thrust for a given rate of fuel consumption, this also increases air flow to the core engine which speeds up.

The second, low pressure, turbine rotates faster by approximately 10% to give more work, i.e. the torque remains the same but the speed of rotation increases. The rate of fuel consumption can be optimised at cruise by opening the exhaust nozzle to maximum and reducing the rate of fuel consumption, while maintaining the required thrust.

The petals 114 are closed to give a minimum area for the exhaust nozzle, this increases the back pressure, causes the second turbine to rotate slower which in turn drives the fan and booster compressor slower.

The turbofan gas turbine engine of the present invention is optimised for efficient cruise condition when most of the fuel is consumed, and at take off condition the turbofan efficiency is compromised to achieve the required thrust.

The fan requires a low tip speed for peak efficiency, and the fan is positioned upstream of the core engine, the fan cannot be driven directly by the low pressure turbine without excessive compromise in the hub/tip diameter ratio of the core engine with associated core engine efficiency losses. A gear assembly 62 is included to enable the high power demand of the fan 72 to be supplied through a relatively small diameter and relatively high speed low pressure turbine shaft 56.

The tip speed of the fan blades is reduced as compared to a direct drive arrangement, and this overcomes the problems of noise generated by the fans with high tip speeds.

The fan assembly may also be of much lighter construction, as the speed of rotation is reduced and the effects of bird impact are not as severe, i.e. speed of rotation of the fan is in the order of 3000 rpm as compared with in the order of 10000 rpm for the booster compressor.

The booster compressor means is driven directly by the second turbine means 20 via the shafts 56,60 and 98, whereas the fan assembly 72 is also driven via gear assembly 62. The booster compressor is therefore driven at a higher speed than the fan assembly, and in this example in the opposite direction, and this has the advantage that the number of stages in the booster compressor may be reduced while producing a suitable pressure rise in the airflow to the core engine. This produces corresponding reductions in the length, weight and drag of the gas turbine engine.

The booster compressor means has only one stage of wide chord blades 96 which match the operating requirements of the fan and the core engine, and the wide chord blades enable the booster compressor to operate over a wide range of mass flow rates of air at a pressure ratio, without the requirement for variable stator vanes, this also reduces the length, weight and drag of the gas turbine engine.

In a turbofan gas turbine engine high propulsive efficiency is achieved by having a large mass flow rate through the fan. The benefit in propulsive efficiency produced by the large air mass flow rate is partially offset by the drag of the fan casing which surrounds the fan. To minimise the drag of the fan casing the diameter and length of the fan casing can be minimised. The fan is therefore designed to have the highest possible throughput velocity in order to achieve a high propulsive efficiency with a minimum of drag.

The fan is driven by the core engine, the efficiency of which is favoured by a relatively low axial velocity. The conflict between the demand for relatively high axial velocity air for the fan, and the demand for relatively low axial velocity air for the core engine, requires that the airflow from the root portion of the fan and booster compressor is efficiently diffused as it flows to the core engine.

An optimum diffuser requires a minimum of deflection or curvature in order to avoid airflow separation on the highest aerodynamically loaded wall and its associated problems for the core engine. An axially straight optimally designed diffuser is ideal.

To minimise the weight of the engine the length between the fan and core engine must be minimised, also low drag is obtained by reducing the length between the fan and the core engine. An axially straight optimally designed diffuser produces a relatively long gas turbine engine which has corresponding increases in weight and drag. If the diffuser is reduced in axial length, optimum diffusion of the air is not achieved, and the efficiency of the core engine or the high mass flow rate of the fan, or both, are compromised.

The diffuser means according to the invention allows the airflow between the fan and the core engine to be diffused adequately without compromising the efficiency of the core engine or the high mass flow rate of the fan, and also minimises the length, weight and drag of the gas turbine engine.

The diffuser means has a plurality of geodesic, or geodetic, pipe diffusers arranged circumferentially, and in which the outlets of the pipe diffusers are displaced circumferentially by an angle of between 20° and 60° with respect to the inlets of the pipe diffusers. The geodesic pipe diffusers enable the length of the diffuser to be sufficiently long for optimum diffusion, while minimising the axial length, weight, and drag of the gas turbine engine and enables the airflow to the core engine to remain substantially axial.

Each geodesic pipe diffuser follows a substantially straight line path between the inlet and the outlet thereof, and diffusion of the air takes place in a substantially straight line through each geodesic pipe diffuser. The diffusion rate of the air in each geodesic pipe diffuser is substantially the same at all points in each plane perpendicular to the general direction of the air flow through the geodesic pipe diffuser except for boundary layer effects, i.e. the isobars in each geodesic pipe diffuser lie in planes perpendicular to the general direction of the airflow. The diffusion rate of the air from plane to plane may vary, but the diffusion rate at all points on a plane is the same. It is a fact that the use of curvatures or deflections of pipe diffusers cause the air flow to decelerate adjacent some curved walls and to accelerate adjacent other curved walls, leading to airflow separation on the highest aerodynamically loaded walls. The geodesic pipe diffusers have little curvature or deflection, and have reduced aerodynamic wall loading to reduce uneven diffusion therethrough.

The air leaving the outlet of the geodesic pipe diffusers has axial and tangential flow components and may have minor components of swirl or whirl about the central line of the geodesic pipe diffuser, depending upon the cross-sectional shape of the geodesic pipe diffuser. If the geodesic pipe diffusers have circular cross-sectional shape then the swirl component may be zero or substantially zero. It is to be noted that the air leaving the geodesic pipe diffuser does not have a radial flow component.

The geodesic pipe diffusers are for use between axially spaced compressors in which the exit radius of the upstream compressor is greater than the inlet radius of the downstream compressor, and they enable diffusion to take place in a relatively short axial distance.

Figure 3:
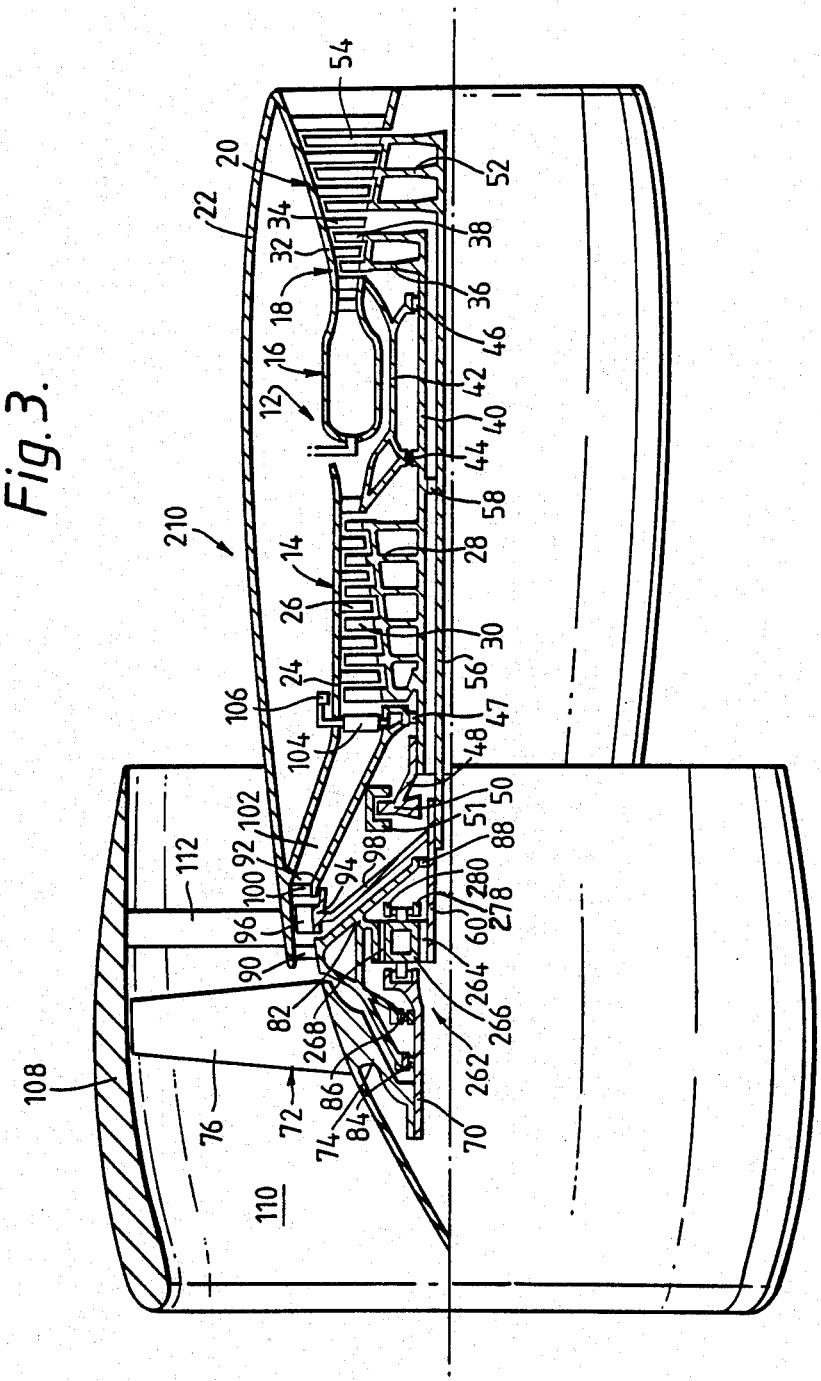
FIG. 3 is a part sectional view of a second embodiment of a turbofan gas turbine engine according to the present invention.
Figure 4:
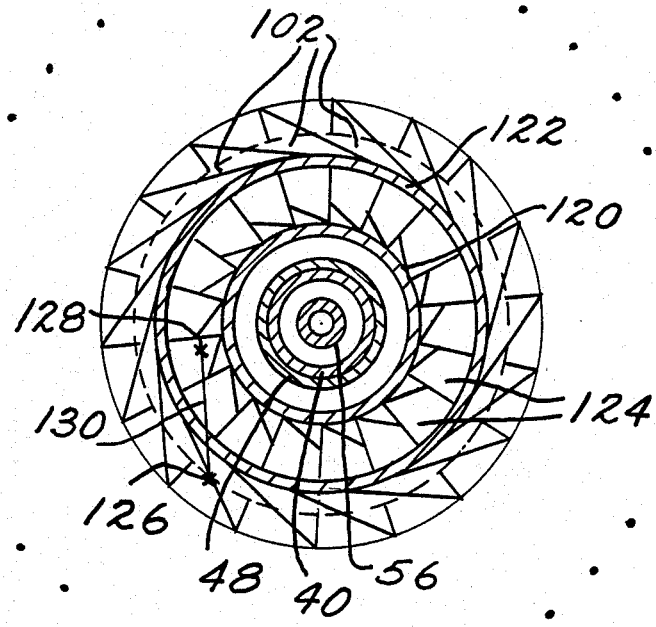
FIG. 4 is a schematic illustration taken along line A—A of FIG. 1.

FIG. 3 shows a second embodiment of a turbofan gas turbine engine 210 which is substantially the same as the embodiment shown in FIG. 1, and like parts are denoted by like numerals. The major difference between the two embodiments is in the gear assemblies, thus in this embodiment a gear assembly 262 is driven by the stub shaft 60, and the gear assembly comprises a sun gear 264 which is secured to, and driven by, the stub shaft 60, a plurality of planet gears 266 meshing with and driven by the sun gear 264 and an annulus gear 268 meshing with and driven by the planet gears 266. The annulus gear 268 is secured to, or is integral with, a gear housing 82 which surrounds the gear assembly 262, and the annulus gear may be secured to the gear housing so as to allow the gear assembly to float for equal power sharing. The planet gears 266 are rotatably mounted in a planet carrier 278 by bearings 280. The planet carrier 278 is secured to the shaft 70, which is secured to and drives the fan assembly 72.

This produces a fan assembly which rotates slower than the booster, but in the same direction as the booster, and the fan assembly in this embodiment will run at a relatively faster speed than that in the first embodiment. This may be suitable for a turbofan gas turbine engine of relatively smaller bypass ratio and smaller fan diameter.

The embodiment in FIG. 1 is more suitable for a turbofan of relatively large bypass ratio and larger fan diameter.

The embodiments in FIGS. 1 and 3 are both directed to the use of a booster compressor with a single stage of wide chord blades, as the core engines have a high pressure ratio and a high efficiency.

However it would be possible to apply the features of the invention to a core engine which has a lower pressure ratio. In this instance the fan would again be gear driven, and the booster compressor would once again be directly driven by the turbine. A geodesic pipe diffuser would also be used. The major difference would be in the booster compressor, which would require more than one stage of wide chord blades, i.e., two, three or four stages, and variable stator vanes may be required.

In summary the invention enables the length, weight and drag of the turbofan gas turbine engine to be minimised by minimising the number of booster compressor stages and by minimising the axial length for diffusion. This enables a turbofan gas turbine engine to have high propulsive efficiency with reduced weight and drag, and the gas turbine engine comprises in flow series a high mass flow rate geared fan which has the highest throughput velocity, a direct drive single stage wide chord booster compressor, a geodesic diffuser and a high efficiency core engine, the fan being enclosed in a short, thin supercritical laminar flow fan casing.

I claim:

1. A turbofan gas turbine engine comprising in axial flow series a fan, a booster compressor means, a compressor means, a combustor means, a first turbine means and a second turbine means,
   the first turbine means being arranged to drive the compressor means,
   the second turbine means being arranged to drive the fan and the booster compressor means,
   a diffuser means being positioned axially between the booster compressor means and the compressor means, the diffuser means comprising a plurality of circumferentially arranged geodesic pipe diffusers, each geodesic pipe diffuser having an inlet at the upstream end and an outlet at the downstream end, the outlet of each geodesic pipe diffuser being displaced circumferentially by an angle with respect to the inlet thereof, each geodesic pipe diffuser following substantially the shortest path between the inlet and the outlet thereof; said geodesic diffusers extending both axially and radially inwardly and each following substantially a straight line path between said respective inlet and outlet thereof.

2. A turbofan gas turbine engine as claimed in claim 1 in which the outlet of each geodesic pipe diffuser is displaced circumferentially by an angle of between 20° and 60° with respect to the inlet thereof.

3. A turbofan gas turbine engine as claimed in claim 2 in which the outlet of each geodesic pipe diffuser is displaced circumferentially by an angle of substantially 40° with respect to the inlet thereof.

4. A turbofan gas turbine engine as claimed in claim 1 in which the second turbine means drives the fan via a shaft means and a gear means, the second turbine means drives the booster compressor means via the shaft means.

5. A turbofan gas turbine engine as claimed in claim 4 in which the gear means comprises a sun gear, a plurality of planet gears, a planet carrier and an annulus gear, the sun gear being driven by the shaft means, the planet gears meshing with and being driven by the sun gear, the planet gears meshing with and driving the annulus gear, the planet gears being rotatably mounted on the planet carrier, the planet carrier being connected to static structure and the annulus gear being arranged to drive the fan.

6. A turbofan gas turbine engine as claimed in claim 4 in which the gear means comprises a sun gear, a plurality of planet gears, a planet carrier and an annulus gear, the sun gear being driven by the shaft means, the planet gears meshing with and being driven by the sun gear, the planet gears meshing with the annulus gear, the planet gears being rotatably mounted on the planet carrier, the annulus gear being connected to static structure and the planet carrier being arranged to drive the fan.

7. A turbofan gas turbine engine as claimed in claim 1 in which the booster compressor means comprises a plurality of wide chord blades and a booster rotor, the wide chord blades being arranged circumferentially on the booster rotor in at least one stage.

8. A turbofan gas turbine engine as claimed in claim 1 in which the fan comprises a plurality of wide chord fan blades and a fan rotor, the wide chord fan blades being arranged circumferentially on the fan rotor.

9. A turbofan gas turbine engine as claimed in claim 1 in which the fan is enclosed by a coaxial laminar fan casing.

10. A turbofan gas turbine engine comprising in axial flow series a fan, a booster compressor means, diffuser means, compressor means, combustor means, first turbine means and a second turbine means,
a first shaft means to drivingly connect the first turbine means and the compressor means, the first turbine means being arranged to drive the compress means via the first shaft means,
a second shaft means to drivingly connect the second turbine means and the booster compressor means, the second turbine means being arranged to drive the booster compressor means via the second shaft means,
a gear means to drivingly connect the second shaft and the fan, the second turbine being arranged to drive the fan via the second shaft means and the gear means,
the booster compressor means comprising a booster rotor and a plurality of wide chord blades, the wide chord blades being arranged circumferentially on the booster rotor in at least one stage,
the diffuser means comprising a plurality of circumferentially arranged geodesic pipe diffusers, each geodesic pipe diffuser having an inlet at the upstream end and an outlet at the downstream end, the outlet of each geodesic pipe diffuser being displaced circumferentially by an angle with respect to the inlet thereof, each geodesic pipe diffuser following substantially the shortest path between the inlet and the outlet thereof; said geodesic pipe diffusers extending axially and radially inwardly and each following substantially a straight line path between said respective inlet and outlet thereof.

11. A turbofan gas turbine engine as claimed in claim 10 in which the outlet of each geodesic pipe diffuser is displaced circumferentially by an angle of between 20° and 60° with respect to the inlet thereof.

12. A turbofan gas turbine engine as claimed in claim 10 in which the gear means comprises a sun gear, a plurality of planet gears, a planet carrier and an annulus gear, the sun gear being driven by the second shaft means, the planet gears meshing with and being driven by the sun gear, the planet gears meshing with and driving the annulus gear, the planet gears being rotatably mounted on the planet carrier, the planet carrier being connected to static structure and the annulus gear being arranged to drive the fan.

13. A turbofan gas turbine engine as claimed in claim 10 in which the gear means comprises a sun gear, a plurality of planet gears, a planet carrier and an annulus gear, the sun gear being driven by the second shaft means, the planet gears meshing with and being driven by the sun gear, the planet gears meshing with the annulus gear, the planet gears being rotatably mounted on the planet carrier, the annulus gear being connected to static structure and the planet carrier being arranged to drive the fan.

14. A turbofan gas turbine as claimed in claim 10 in which the fan comprises a fan rotor and a plurality of wide chord fan blades, the wide chord fan blades being arranged circumferentially on the fan rotor.

15. A turbofan gas engine as claimed in claim 10 in which the fan is enclosed by a coaxial laminar fan casing.

16. A diffuser means for an axial flow gas turbine engine comprising a plurality of geodesic pipe diffusers, each geodesic pipe diffuser extending axially and radially inwardly, each geodesic pipe diffuser having an inlet at one end and an outlet at the second end, the outlet of each geodesic pipe diffuser being displaced circumferentially by an angle with respect to the inlet thereof, each geodesic pipe diffuser following substantially the shortest path between the inlet and the outlet thereof, each said geodesic pipe diffuser following substantially a straight line path between said respective inlet and outlet thereof.

17. A diffuser means as claimed in claim 16 in which the outlets of the geodesic pipe diffusers are displaced circumferentially by an angle of between 20° and 60° with respect to the inlets of the geodesic pipe diffusers.

18. A diffuser means as claimed in claim 17 in which the outlets of the geodesic pipe diffusers are displaced circumferentially by an angle of substantially 40° with respect to the inlets of the geodesic pipe diffusers.

19. A diffuser means as claimed in claim 16 in which each geodesic pipe diffuser follows substantially a straight line path between the inlet and the outlet thereof.

* * * * *